United States Patent [19]

Nishikawa et al.

[11] Patent Number: 4,575,835

[45] Date of Patent: Mar. 11, 1986

[54] MOTOR CONTROL CIRCUIT OF DATA REPRODUCTION APPARATUS

[75] Inventors: Meisei Nishikawa, Yokohama; Tadashi Kojima, Yokosuka, both of Japan

[73] Assignee: Tokyo Shibaura Denki Kabushiki Kaisha, Kawasaki, Japan

[21] Appl. No.: 473,768

[22] Filed: Mar. 10, 1983

[30] Foreign Application Priority Data

Jun. 15, 1982 [JP] Japan ............................ 57-102820
Jun. 15, 1982 [JP] Japan ............................ 57-102823

[51] Int. Cl.$^4$ ............................................. G11B 17/00
[52] U.S. Cl. ........................................ 369/50; 369/59; 369/240
[58] Field of Search ............ 369/43, 44, 47, 50, 369/59, 239, 240

[56] References Cited

U.S. PATENT DOCUMENTS 4,338,683 7/1982 Furukawa et al. .............. 369/50

FOREIGN PATENT DOCUMENTS

| 11494 | 5/1980 | European Pat. Off. . |
| 49136 | 4/1982 | European Pat. Off. . |
| 5534621 | 7/1971 | Japan . |
| 5647619 | 12/1976 | Japan . |
| 2064172 | 6/1981 | United Kingdom . |
| 2085199 | 4/1982 | United Kingdom . |

Primary Examiner—Robert L. Richardson
Attorney, Agent, or Firm—Cushman, Darby and Cushman

[57] ABSTRACT

The invention relates to a motor control circuit of a data reproduction apparatus, which drives a disk motor to reproduce a data signal recorded together with a sync signal on a recording medium so as to control the disk motor in accordance with a reproduced sync signal. The frequency and phase components of the reproduced sync signal are detected, and first and second motor control signals are produced in accordance with frequency and phase detection signals, respectively. A control circuit detects whether or not the frequency detection signal falls within a predetermined range. If it is determined that the frequency detection signal does not fall within the predetermined range, the second motor control signal is kept at a predetermined value.

6 Claims, 31 Drawing Figures

MOTOR CONTROL CIRCUIT OF DATA REPRODUCTION APPARATUS

BACKGROUND OF THE INVENTION

The present invention relates to a data reproduction apparatus such as a DAD (digital audio disk) reproduction apparatus of a CD (optical compact disk) type and, more particularly, to a motor control circuit of a data reproduction apparatus.

A PCM (pulse code modulation) digital recording/reproduction system has been recently adopted in order to achieve a higher fidelity in acoustic equipment. This is because a digital audio technique has been established which provides better audio characteristics than the conventional analog recording/reproduction systems without dependency on the characteristics of a recording medium.

Among the digital audio systems, there is a system called a DAD system which records signals on and reproduces them from a recording disk. Various recording/reproduction systems for the DAD system have been proposed such as optical, electrostatic and mechanical systems. Whichever one of these recording/reproduction systems is used, the data reproduction apparatus must satisfy various control functions and high-performance requirements which are higher than those of the conventional data reproduction apparatus.

In a CD reproduction apparatus, for example, a disk is used which comprises a transparent plastic disk 12 cm in diameter and 1.2 mm thick, with a thin metal film formed on the transparent plastic disk. Pits (indentation patterns of different reflectivities) are formed in the thin metal film to correspond to digital (PCM) data. The CD disk is scanned by an optical pickup which is moved from the innermost track to the outermost track in the radial direction of the CD disk. An optical pickup which has a semiconductor laser and a photoelectric transducer therein is used to scan the rotating CD disk. The CD disk must be rotated at a constant linear velocity (CLV) all the time. The speed of rotation of the CD disk must therefore continuously change from 500 rpm to 200 rpm as the optical pickup moves from the innermost track to the outermost track. Since the CD disk has a track pitch of 1.6 μm to allow one-hour stereo playing on one side thereof, a great amount of data may be recorded on the CD disk in a program area (at a radius of 25 to 58 mm), and index data thereof are recorded on a lead-in area (at a radius of 23 to 25 mm). As a result, highly precise control functions and the like are required.

Figure 1:
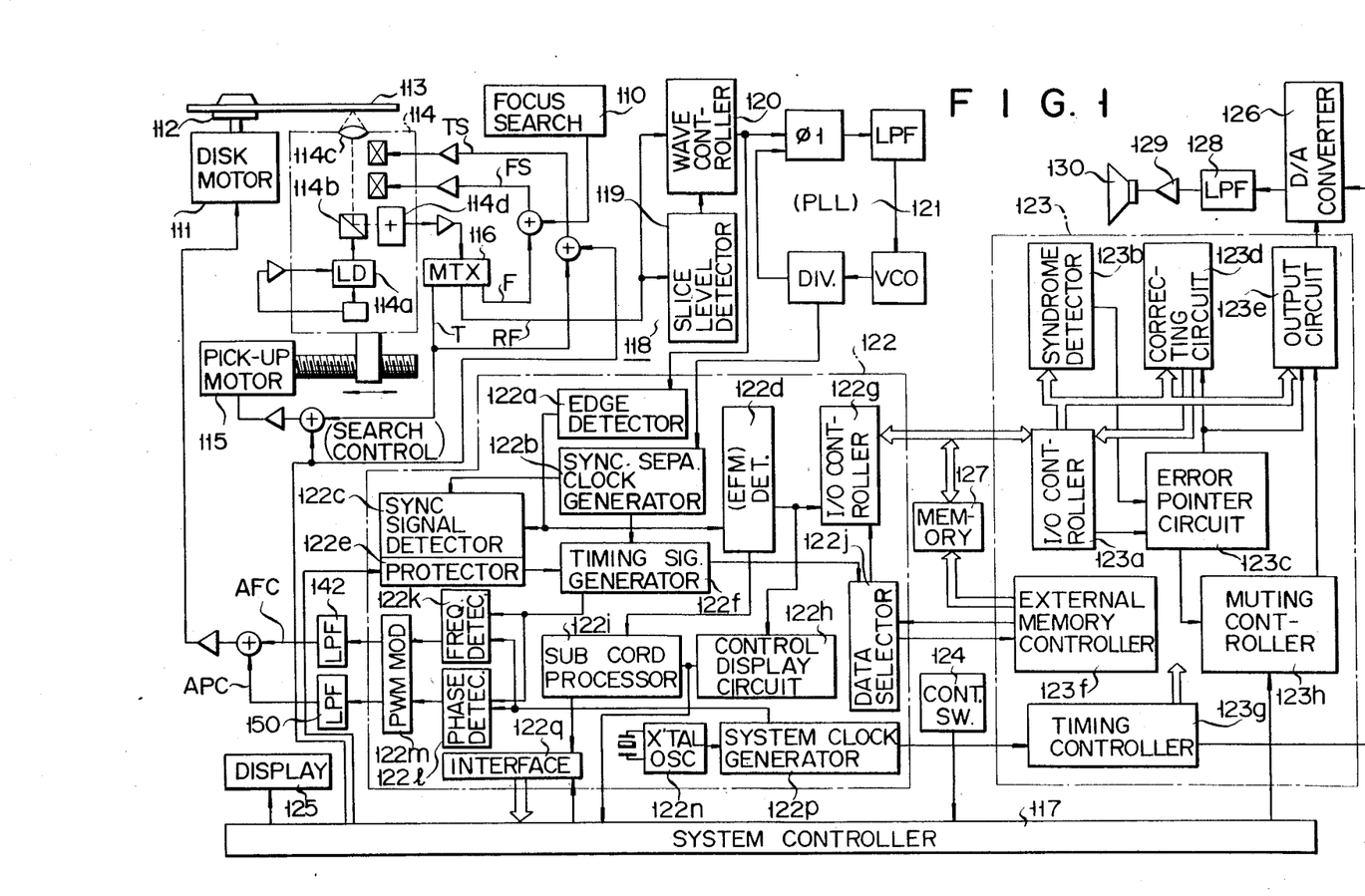
FIG. 1 is a block diagram showing the overall configuration of a conventional DAD reproduction apparatus.

FIG. 1 is a block diagram of a DAD reproduction apparatus of a CD system.

As shown in FIG. 1, the DAD apparatus comprises a disk motor 111 for rotating a turntable 112. An optical disk 113 is mounted on the turntable 112. The disk 113 has pits which correspond to digital audio signals (i.e., PCM codes) which have been EFM (Eight to Fourteen Modulation)-modulated and interleaved. An optical pickup 114 emits a laser beam from a semiconductor laser 114a. The laser beam passes through a beam splitter 114b and is focused by an objective lens 114c. The beam illuminates the track of the optical disk 113. The beam reflected from the pits passes through the objective lens 114c and the beam splitter 114b. It is then guided to a four-element photodetector 114d. The photodetector 114d converts the laser beam into four signals. The pickup 114 is moved by a pickup feed motor 115 in the radial direction of the optical disk 113.

The four signals from the photodetector 114d are supplied to a matrix circuit 116 and undergo a specific matrix operation. As a result, the matrix circuit 116 generates a focus error signal F, a tracking error signal T and a high-frequency signal RF. The focus error signal F and a focus search signal from a focus search circuit 110 are used to drive a focus servo system of the optical pickup 114. The tracking error signal T and a search control signal supplied from a system controller 117 are used to drive a tracking servo system of the optical pickup 114 and to control the pickup feed motor 115. The high-frequency signal RF is supplied to a reproduced signal processing system 118 as a major reproduced signal component. In the system 118 the signal RF is supplied to a waveform shaping circuit 120 which is controlled by a slice level (eye pattern) detector 119. The waveform shaping circuit 120 divides the input signal into an unnecessary analog component and a necessary data component. The necessary data component is supplied to a sync clock reproducing circuit 121 of PLL (phase locked loop) type and also to an edge detector 122a of a first signal processing system 122.

A sync clock from the sync clock reproducing circuit 121 is supplied to a clock-pulse generating circuit 122b of the first signal processing system 122. In response to the sync clock, the clock-pulse generating circuit 122b generates a clock-pulse for dividing a sync signal into components. On the other hand, the necessary data component from the edge detector 122a is supplied to a sync signal detector 122c. The sync signal detector 122c divides the data components in response to a sync signal dividing clock from the clock-pulse generating circuit 122b. The necessary data component from the edge detector 122a is also supplied to a demodulating circuit 122d and is then EFM-demodulated. A sync signal from the sync signal detector 122c is supplied to a sync signal protecting circuit 122e and then to a timing signal generating circuit 122f. A clock from the clock-pulse generating circuit 122b is also supplied to the timing signal generating circuit 122f. The timing signal generating circuit 122f generates a timing signal for processing input data.

An output signal from the demodulating circuit 122d is supplied through a data bus input/output control circuit 122g to an input/output control circuit 123a of a second signal processing system 123. The output signal from the demodulating circuit 122d contains a sub-code (i.e., a control signal) and a display signal component. The display signal component is supplied to a control display processing circuit 122h and the sub-code is supplied to a sub-code processing circuit 122i.

The sub-code processing circuit 122i detects an error, if any, in the sub-code, corrects the error, and then generates sub-code data. The sub-code data is supplied to the system controller 117 through an interface circuit 122q which is connected to the system controller 117.

The system controller 117 includes a microcomputer, an interface circuit and a driver integrated circuit. In response to an instruction from a control switch 124 the system controller 117 controls the DAD apparatus in a desired manner and causes a display device 125 to display the sub-code (e.g., index data about a piece of music to be reproduced).

The timing signal from the timing signal generating circuit 122f is supplied through a data selecting circuit 122j to the data bus input/output control circuit 122g and controls the data bus input/output control circuit 122g. The timing signal is also supplied to a frequency detector 122k and a phase detector 122l, and also to a PWM (pulse width modulation) modulator 122m. The timing signal from the PWM modulator 122m then undergoes automatic frequency control (AFC) and automatic phase control (APC) so as to rotate the disk motor 111 at a constant linear velocity (CLV).

The frequency detector 122m and the phase detector 122l are connected to receive a system clock-pulse from a system clock-pulse generating circuit 122p, which operates under the control of an output signal from a quartz crystal oscillator 122n.

The demodulated data from the input/output control circuit 123a of the second signal processing system 123 is supplied through a data output circuit 123e to a D/A (digital-to-analog) converter 126 after it has undergone necessary error correction, deinterleaving and data supplementation at a syndrome detector 123b, and to an error pointer control circuit 123c, and to an error correction circuit 123d. The second signal processing system 123 includes an external memory control circuit 123f. The control circuit 123f cooperates with the data selecting circuit 122j of the first signal processing system 122 to control an external memory 127 which stores data necessary for correcting errors. Under the control of the circuits 123f and 122j the data are read from the external memory 127 and supplied to the input/output control circuit 123a.

The second signal processing system 123 further comprises a timing control circuit 123g and a muting control circuit 123h. The timing control circuit 123g is so designed as to supply, in response to a system clock-pulse generated by the system clock-pulse generating circuit 122p, a timing control signal which is necessary in correcting errors, supplementing data and converting digital data into analog data. The muting control circuit 123h is so designed as to achieve, in response to a control signal from the error pointer control circuit 123c or from the system controller 117, a specific muting control which is necessary in supplementing data and in starting and ending DAD reproduction.

An audio signal, or an analog output signal from the D/A converter 126 is supplied through a low pass filter 128 and an amplifier 129 to a loudspeaker 130.

Figure 2:
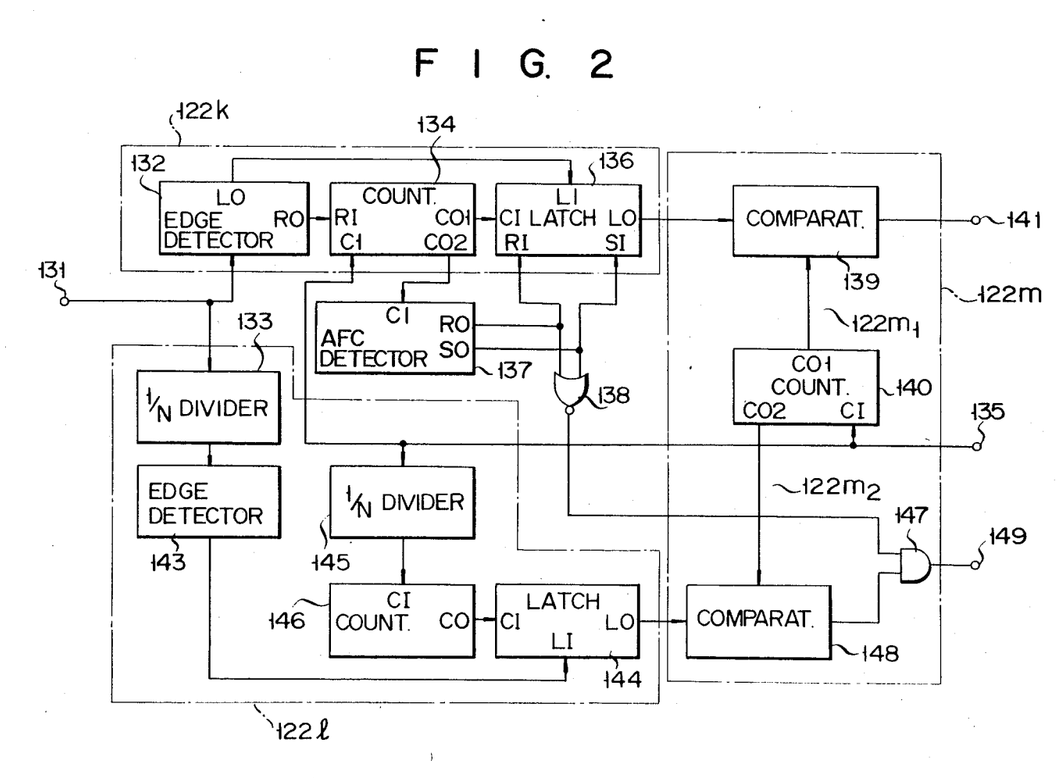
FIG. 2 is a block diagram of a motor controlling means of the DAD reproduction apparatus shown in FIG. 1.

Means for controlling the disk motor 111 (i.e., the frequency detector 122k, the phase detector 122l and the PWM modulator 122m) in the DAD apparatus of the type described above are described in detail with reference to the accompanying drawings. Referring to FIG. 2, reference numeral 131 denotes an input end which receives a timing signal from the timing signal generating circuit 122f. The timing signal is obtained by frequency-dividing a sync signal from the sync signal detector 122c by a predetermined frequency division ratio. The frequency-divided sync signal is then used for controlling rotation of the disk motor 111, to be described in detail. Here, the frequency-divided sync signal is called the control signal. The input end 131 is connected to the input end of an edge detector 132 included in the frequency detector 122k and to the input end of a 1/N divider 133 included in the phase detector 122l. A reset signal output end RO of the edge detector 132 is connected to a reset signal input end RI of a counter 134. A count signal input end CI of the counter 134 is connected to a clock input end 135 of the system clock generating circuit 122p. The clock input end 135 receives the system clock signal. Since the system clock signal is the reference signal to control the disk motor 111 so as to rotate the optical disk 113 at a constant linear velocity, the system clock signal will be called a reference clock signal here. The counter 134 has first and second count signal output ends $CO_1$ and $CO_2$. The first count signal output end $CO_1$ is connected to the count signal input end CI of a latch circuit 136, and the second count signal output end $CO_2$ is connected to the count signal input end CI of an AFC detector 137. Set and reset signal output ends SO and RO of the AFC detector 137 are connected to set and reset signal input ends SI and RI of the latch circuit 136, respectively, and also to the two input ends of a NOR gate 138. A latch pulse output end LO of the edge detector 132 is connected to a latch pulse input end LI of the latch circuit 136. A latch signal output end LO of the latch circuit 136 is connected to one input end of a comparator 139 of the PWM modulator 122m which has the first and second motor control signal generating means $122m_1$ and $122m_2$. The other end of the comparator 139 is connected to a first count signal output end $CO_1$ of a ramp counter 140. The output end of the comparator 139 is connected through a connecting end 141 to the input end of a low-pass filter (LPF) 142 shown in FIG. 1.

The output end of the 1/N divider 133 is connected to a latch pulse input end LI of a latch circuit 144 through an edge detector 143. The clock input end 135 is connected to a count signal input end CI of a counter 146 through the 1/N divider 145. A count signal output end CO of the counter 146 is connected to a count signal input end CI of the latch circuit 144. The output end of the NOR gate 138 is connected to one input end of an AND gate 147. A latch signal output end LO of the latch circuit 144 is connected to one input end of a comparator 148. The other input end of the comparator 148 is connected to a second count signal output end $CO_2$ of the ramp counter 140. A count signal input end CI of the ramp counter 140 is connected to the clock input end 135. The output end of the comparator 148 is connected to the other input end of the AND gate 147. The output end of the AND gate 147 is connected through a connecting end 149 to the input end of a low-pass filter (LPF) 150 shown in FIG. 1.

The mode of operation of the disk motor control means having an arrangement as described above will be described with reference to FIGS. 3A to 3I. When the optical disk 113 is rotated and the sync signal is obtained as shown in FIG. 1, the control signal (FIG. 3A) obtained by frequency-dividing the sync signal in accordance with a predetermined frequency division ratio is supplied to the input end 131. The edge detector 132 detects the trailing edge of the control signal and produces a pulse signal shown in FIG. 3B from the reset signal output end RO and the latch pulse output end LO every time the control signal falls.

Meanwhile, when the reference clock signal from the clock input end 135 is supplied to the count signal input end CI of the ramp counter 140, the ramp counter 140 counts it. When the count of the ramp counter 140 reaches a predetermined value, the ramp counter 140 is automatically reset and starts counting the reference pulses once again. The ramp counter 140 repeats the counting operation in the manner described above. Therefore, the count signal from the first and second count signal output ends $CO_1$ and $CO_2$ of the ramp counter 140 has a predetermined sawtooth waveform which has a period independent of the period of the control signal, as shown in FIG. 3C.

Similarly, when the reference clock signal from the clock input end 135 is supplied to the counter 134, the counter 134 counts it. However, the counter 134 is reset every time the pulse is supplied from the edge detector 132 to the reset signal input end RI thereof. The count signal from the first and second count signal output ends $CO_1$ and $CO_2$ of the counter 134 has a sawtooth waveform synchronous with the period of the control signal. The count of the counter 134 corresponds to the frequency of the control signal.

The count signal of the counter 134 is supplied from the first and second count signal output ends $CO_1$ and $CO_2$ thereof to the count signal input ends CI of the latch circuit 136 and the AFC detector 137, respectively. Every time the pulse (FIG. 3B) from the latch pulse output end LO of the edge detector 132 is supplied to the latch pulse input end LI of the latch circuit 136, the latch circuit 136 holds the count signal supplied to the count signal input end CI thereof. In other words, a hold signal as shown in FIG. 3E obtained by holding the maximum count signal of the sawtooth waveform shown in FIG. 3D appears at the latch signal output end LO of the latch circuit 136.

In this condition, the holding operation of the latch circuit 136 is controlled by the AFC detector 137. The AFC detector 137 detects whether or not the count (corresponding to the frequency of the control signal) of the counter 134 falls within a predetermined range. More particularly, the count of the counter 134 corresponds to the frequency of the control signal; to detect whether or not the count falls within the predetermined range is to detect whether or not the frequency of the control signal falls within a predetermined frequency range.

When the count of the counter 134 does not fall within the predetermined range (i.e., before time T1), either the set signal output end SO or the reset signal output end RO of the AFC detector 137 is set at high level (to be referred to as H level). The designer can determine which one of the set and reset signal output ends SO and RO is to be set at H level as needed. For example, if the set signal output end SO goes high, a maximum count signal is forcibly produced from the latch signal output end LO of the latch circuit 136, independently of the output from the counter 134. However, if the reset signal output end RO goes high, a signal corresponding to the count "0" is produced from the latch signal output end LO of the latch circuit 136. In this example, assume that the reset signal output end RO of the AFC detector 137 goes high when the count of the counter 134 does not fall within the predetermined range.

When the optical disk 113 is just beginning to be rotated, (i.e., before time T1 in FIG. 3), the rotational speed of the optical disk 113 is not yet normal. The frequency of the control signal thus does not fall within the predetermined frequency range. The latch signal output end LO of the latch circuit 136 corresponds to the count "0". The count "0" is compared by the comparator 139 with the count of the ramp counter 140. When the count of the latch circuit 136 is smaller than the count of the ramp counter 140, the comparator 139 produces an output of low level (to be referred to as L level). However, when the count of the latch circuit 136 is equal to or larger than that of the ramp counter 140, the comparator 139 produces an output of H level.

Figure 3:
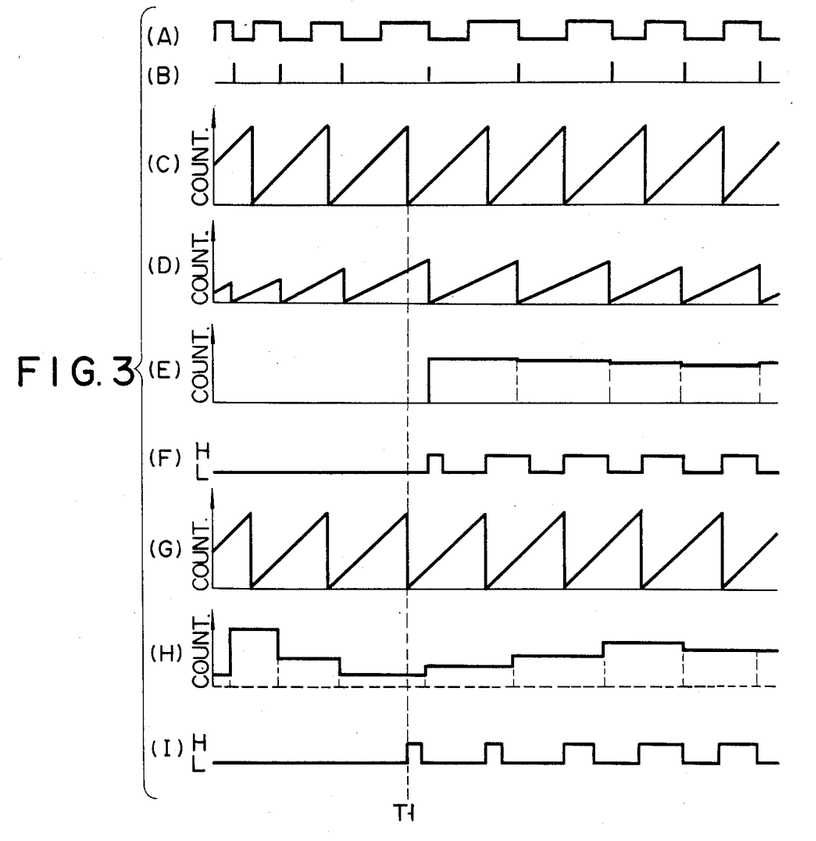

Before time T1 in FIG. 3, the output from the comparator 139 is kept at L level, as shown in FIG. 3F. In this condition, a reference voltage $V_{OF}$ (FIG. 4) which is substantially half of a voltage $V_R$ is supplied to the disk motor 111. Note that the voltage $V_R$ is obtained from the low-pass filter 142 and is used for automatic frequency control.

Assume that the rotational speed of the optical disk 113 is increased and that the frequency of the control signal reaches the predetermined frequency at time T1. The reset signal output end RO of the AFC detector 137 is set to L level. The latch circuit 136 then starts the holding operation. The count of the hold signal is compared with the count of the ramp counter 140. The comparator 139 then produces an automatic frequency control signal as a first motor control signal (to be referred to as an AFC signal) shown in FIG. 3F. In particular, the count of the latch circuit 136 which corresponds to the frequency of the control signal is compared with the count signal of the ramp counter 140 which has a reference period. A signal corresponding to the difference between the count signals from the latch circuit 136 and the ramp counter 140 is produced by the comparator 139 and is then pulse-width modulated to produce the AFC signal. The AFC signal is then supplied as an AFC voltage $V_F$ to the disk motor 111 through the low-pass filter 142 shown in FIG. 1.

Figure 4:
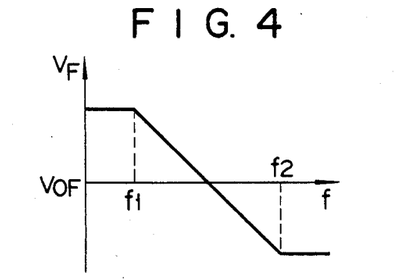
FIGS. 4 and 5 are timing charts of motor control signals of the motor controlling means shown in FIG. 2.

FIG. 4 is a graph for explaining the AFC voltage $V_F$ as a function of frequency f of the control signal. Automatic frequency control can be properly performed when the control signal has a frequency in a frequency range of f1 to f2. The AFC detector 137 detects whether or not the frequency of the control signal falls within a frequency range of f1 to f2.

Meanwhile, the control signal from the input end 131 is supplied to the edge detector 143 through the 1/N divider 133. The edge detector 143 detects the trailing edge of the control signal and produces a pulse as shown in FIG. 3B every time it detects the trailing edge. In practice, the control signal is obtained by the 1/N divider 133, but it is equivalent to the signal shown in FIG. 3A, so that the waveform of the control signal is illustrated by the signal shown in FIG. 3A.

When the reference clock signal from the clock input end 135 is supplied to the count signal input end CI of the counter 146 through the 1/N divider 145, the counter 146 counts the 1/N divided signals of the clock signal. Before time T1 in FIG. 3, that is, before automatic frequency control is performed, the reset signal output end RO of the AFC detector 137 is kept at H level, so that the output end of the NOR gate 138 is kept at L level. When the signal which is obtained by 1/N dividing the reference clock signal appearing at the clock input end 135 is supplied to the count signal input end CI of the counter 146 through the 1/N divider 145, the counter 146 counts the 1/N divided signals. When the count of the counter 146 reaches a predetermined value, the counter 146 is automatically reset and is then restarted. The counting operation of the counter 146 is repeated in the manner described above. Therefore, the count signal from the count signal output end CO of the counter 146 has a waveform as shown in FIG. 3G.

The count signal from the counter 146 is supplied from its count signal output end CO to the count signal input end CI of the latch circuit 144. The latch circuit 144 holds the count signal received at the count signal input end CI thereof every time the pulse from the edge detector 143 is supplied to the latch pulse input end LI of the latch circuit 144. The output from the latch circuit 144 is thus shown in FIG. 3H. The output (FIG. 3G) from the latch 144 is compared by the comparator 148 with the output (FIG. 3C) from the count signal output end $CO_2$ of the ramp counter 140. As described above, before time T1, since the output end of the NOR gate 138 is low, the output end of the AND gate 147 is low. As a result, the output from the output end of the AND gate 147 is low, as shown in FIG. 3. In this condition, an APC voltage $V_P$ obtained through the low-pass filter 150 shown in FIG. 1 is kept at a minimum voltage $V_{LP}$ (FIG. 5) which is then applied across the disk motor 111.

At time T1 in FIG. 3, the reset signal output end RO of the AFC detector 137 goes to L level, and the output end of the NOR gate 138 goes to H level. The count signal from the latch circuit 144 and the count signal from the ramp counter 140 are compared by the comparator 148. The comparator 148 produces an automatic phase control signal as a second motor control signal (to be referred to as an APC signal hereinafter) after time T1, as shown in FIG. 3I. Note that the comparator 148 produces a signal of L level when the count signal from the latch circuit 144 is smaller than that of the ramp counter 140 and a signal of H level when the count signal from the latch circuit 144 is equal to or larger than that of the ramp counter 140. More particularly, the output from the counter 146 which performs repeat counting is held for the period of the control signal. A resultant signal is compared with the count signal from the ramp counter 140 which has the reference period (phase). A comparison signal is pulse-width modulated to obtain the APC signal. The APC signal is then supplied as an APC voltage $V_P$ to the disk motor 111 through the low-pass filter 150 shown in FIG. 1.

Figure 5:
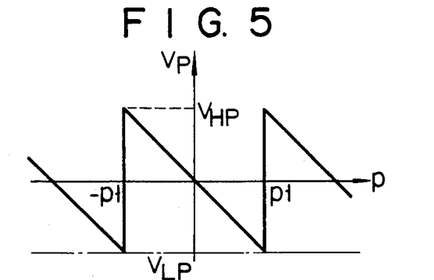

FIG. 5 shows the relationship between the deviation in phase P of the control signal and the APC voltage $V_P$. Automatic phase control can be performed when the deviation in phase P of the control signal falls within a range of $+P1$ to $-P1$. After the frequency f of the control signal is controlled to fall within the frequency range of f1 to f2, automatic phase control is started.

The AFC and APC voltage signals are superposed on each other, and the resultant signal is supplied to the disk motor 111. Therefore, the disc motor 111 can drive the optical disk 113 at a constant linear velocity.

The 1/N dividers 133 and 145 shown in FIG. 2 are used to control a ratio of the AFC gain to the APC gain.

However, the following problems are presented when the disk motor controlling means described above is used. In the above arrangement, the AFC detector 137 detects whether or not the frequency of the control signal falls within the predetermined range. When it is determined that the actual frequency of the control signal does not fall within the predetermined range (i.e., before time T1 in FIG. 3), the output from the connecting end 141 is kept at low level (FIG. 3F) so as not to perform automatic frequency control. However, when it is determined that the frequency of the control signal falls within the predetermined range (i.e., after time T1 in FIG. 3), the AFC signal appears at the connecting end 141.

Furthermore, when the frequency of the control signal falls within the predetermined frequency range, the APC signal is then produced to perform automatic phase control.

Now assume that the states in which automatic frequency control is performed and not performed are defined as AFC ON and AFC OFF, respectively, and that the states in which automatic phase control is performed and not performed are defined as APC ON and APC OFF.

The frequency of the control signal when the APC ON state is changed to the APC OFF state is equal to that of the control signal when the APC OFF state is changed to the APC ON state. If the AFC detector 137 is defined to be a detector which detects whether or not a deviation in frequency of the control signal relative to the reference frequency thereof falls or does not fall within a range of 10%, the frequency of the control signal is considerably deviated from the reference frequency f0 when the APC OFF state is changed to the APC ON state. As a result, when the APC ON state has just been set, phase control cannot be smoothly performed, thus wasting time.

If the AFC detector 137 is then defined to be a detector which detects whether or not a deviation in frequency of the control signal relative to the reference frequency thereof falls or does not fall within 5%, phase control may be properly performed. However, when the rotational speed of the disk motor 111 is slightly changed by an external effect, the frequency of the control signal tends to correspond to that for the APC OFF state. Even if the frequency of the control signal can be used to sufficiently perform automatic phase control, the APC OFF state is set, which is inconvenient.

Furthermore, in the APC OFF state (i.e., before T1 in FIG. 3), the AND gate 147 is kept OFF only by a signal of L level from the set signal output end of the AFC detector 137. In this condition, the APC voltage $V_P$ is kept at the minimum voltage $V_{LP}$ as shown in FIG. 5. When the APC signal is produced at time T1 and corresponds to the maximum voltage $V_{HP}$ shown in FIG. 5, a voltage applied across the disk motor 111 is greatly changed, thus greatly changing the rotational speed of the disk motor 111. As a result, motor control cannot be smoothly performed.

SUMMARY OF THE INVENTION

The present invention has been made in consideration of the conventional drawbacks and has for its object to provide a motor control circuit of a data reproduction apparatus, which has a simple configuration and which is capable of controlling a motor stably and smoothly so as to perform effective data reproduction.

According to one aspect of the present invention, there is provided a motor control circuit of a data reproduction apparatus, comprising a recording medium on which a data signal is recorded together with a sync signal, and a disk motor for driving the recording medium in order to reproduce the data signal and the sync signal from said recording medium, said disk motor being controlled in accordance with a reproduced sync signal, characterized by comprising: frequency detecting means for detecting a frequency component of the reproduced sync signal; phase detecting means for detecting a phase component of the reproduced sync signal; first motor control signal generating means for generating a first motor control signal to control said disk motor in accordance with an output signal from said frequency detecting means; second motor control signal generating means for generating a second motor control signal to control said disk motor in accordance with an output signal from said phase detecting means; and controlling means for detecting whether or not the output signal from said frequency detecting means falls within a predetermined range and for keeping the second motor control signal from said second motor control signal generating means at a predetermined value when the output signal from said frequency detecting means does not fall within a predetermined range.

BRIEF DESCRIPTION OF THE DRAWINGS

FIGS. 3A to 3I are timing charts of signals for explaining the mode of operation of the motor controlling means shown in FIG. 2;

FIGS. 7A to 7I are timing charts for explaining the mode of operation of the motor control circuit shown in FIG. 6;

FIGS. 11A to 11D are timing charts of signals for explaining the mode of operation of the first motor control signal generating means shown in FIG. 10.

DETAILED DESCRIPTION OF THE PREFERRED EMBODIMENT

A motor control circuit according to an embodiment of the present invention will be described with reference to the accompanying drawings. The same reference numerals as used in FIG. 2 denote the same parts in FIG. 6, and a detailed description thereof will be omitted. The latch circuit 136 has two latch signal output ends $LO_1$ and $LO_2$, which both produce the same signal. The latch signal output end $LO_1$ is connected to one input end of the comparator 139. The latch signal output end $LO_2$ is connected to the input end of a control circuit 151 to be described in detail later.

Figure 6:
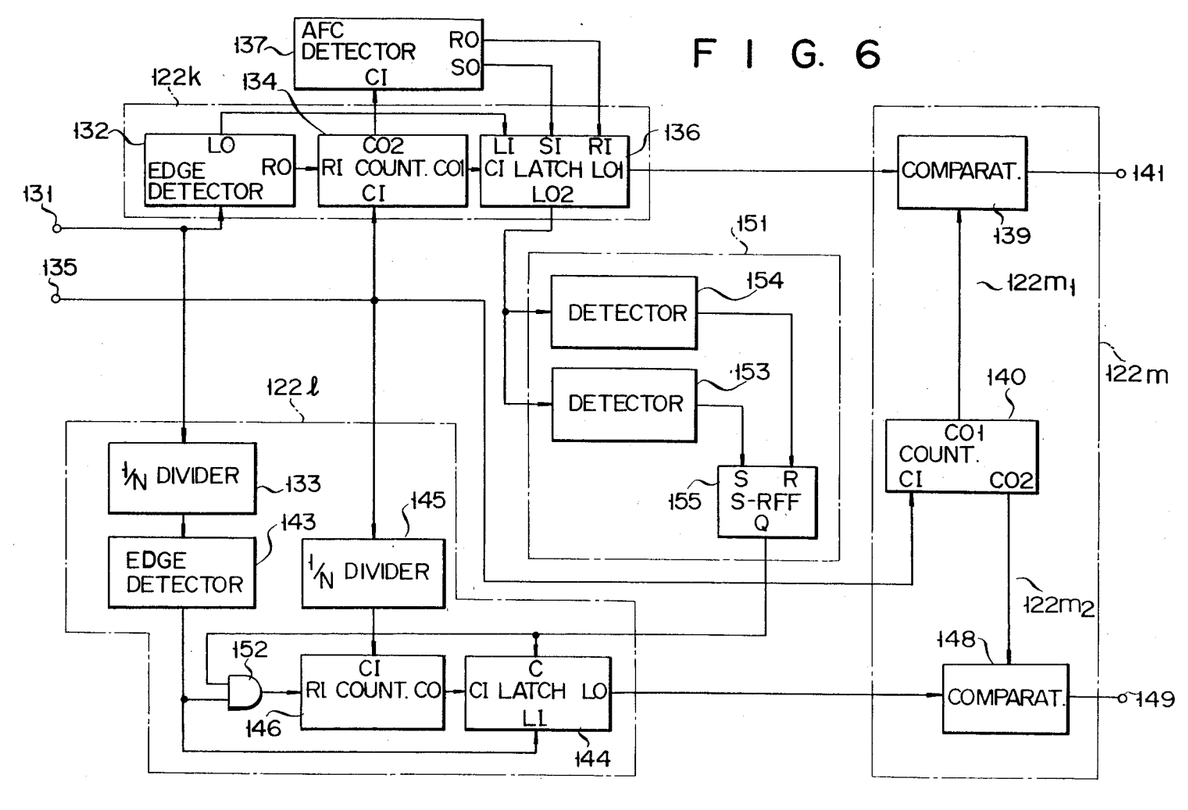
FIG. 6 is a block diagram of a motor control circuit of a data reproduction apparatus according to an embodiment of the present invention.

The output end of the control circuit 151 is connected to a control input end C of the latch circuit 144 and to one input end of an AND gate 152. The other input end of the AND gate 152 is connected to the output end of the edge detector 143. The output end of the AND gate 152 is connected to the reset signal input end RI of the counter 146. The output end of the comparator 148 is connected to the input end 149.

A detailed description of the control circuit 151 will be made later on. A function of the control circuit 151 will now be briefly described. When the latch signal output end $LO_2$ of the latch circuit 136 becomes low, that is, when the frequency of the control signal falls within the frequency range of f1 to f2 in FIG. 4, the control circuit 151 produces a signal of H level. However, the control circuit 151 produces a signal of L level when the frequency of the control signal does not fall within the frequency range of f1 to f2. The counter 146 is reset every time the pulse from the edge detector 143 is supplied to the reset signal input end RI thereof through the AND gate 152. When the control input end C of the latch circuit 144 is kept at H level, the count signal from the latch signal output end LO thereof is forcibly kept at a given value to be described later.

The mode of operation of the disk motor control circuit which has the above arrangement will now be described with reference to FIGS. 7A to 7H. When the optical disk 113 is rotated and the sync signal is produced as described with reference to FIG. 2, the sync signal is frequency-divided by a predetermined frequency division ratio, thereby producing a control signal as shown in FIG. 7A. The control signal is then supplied to the input end 131. The edge detector 132 detects the trailing edge of the control signal and produces a pulse signal shown in FIG. 7B from the reset signal output end RO and the latch pulse output end LO every time the control signal falls.

Meanwhile, when the reference clock signal from the clock input end 135 is supplied to the count signal input end CI of the ramp counter 140, the ramp counter 140 counts it. When the count of the ramp counter 140 reaches a predetermined value, the ramp counter 140 is automatically reset and starts counting the reference pulses once again. The ramp counter 140 repeats the counting operation in the manner described above. Therefore, the count signal from the first and second count signal output ends $CO_1$ and $CO_2$ of the ramp counter 140 has a predetermined sawtooth waveform which has a period independent of the period of the control signal, as shown in FIG. 7C.

Similarly, when the reference clock signal from the clock input end 135 is supplied to the count signal input end CI of the counter 134, the counter 134 counts it. However, the counter 134 is reset every time the pulse is supplied from the edge detector 132 to the reset signal input end RI thereof. The count signal from the first and second count signal output ends $CO_1$ and $CO_2$ of the counter 134 has a sawtooth waveform synchronous with the period of the control signal. The count of the counter 134 corresponds to the frequency of the control signal.

The count signal of the counter 134 is supplied from the first and second count signal output ends $CO_1$ and $CO_2$ thereof to the count signal input ends CI of the latch circuit 136 and the AFC detector 137, respectively. Every time the pulse (FIG. 7B) from the latch pulse output end LO of the edge detector 132 is supplied to the latch pulse input end LI of the latch circuit 136, the latch circuit 136 holds the count signal. In other words, a hold signal as shown in FIG. 7E obtained by holding the maximum count signal of the sawtooth waveform shown in FIG. 7D appears at the latch signal output ends $LO_1$ and $LO_2$ of the latch circuit 136.

In this condition, the holding operation of the latch circuit 136 is controlled by the AFC detector 137. The AFC detector 137 detects whether or not the count (corresponding to the frequency of the control signal) of the counter 134 falls within a predetermined range. More specifically, the count of the counter 134 corresponds to the frequency of the control signal; to detect whether or not the count falls within a predetermined range is to detect whether or not the frequency of the control signal falls within a predetermined frequency range.

When the count of the counter 134 does not fall within the predetermined range (i.e., before time T1 in FIG. 7), either the set signal output end SO or the reset signal output end RO of the AFC detector 137 is set at H level. The designer can determine which one of the set and reset signal output ends SO and RO is to be set at H level as needed. For example, if the set signal output end SO becomes high, a maximum count signal is forcibly produced from the latch signal output ends LO$_1$ and LO$_2$ of the latch circuit 136, independent of the output from the counter 134. However, if the reset signal output end RO goes high, a signal corresponding to the count "0" is produced from the latch signal output ends LO$_1$ and LO$_2$ of the latch circuit 136. In this example, assume that the reset signal output end RO of the AFC detector 137 goes high when the count of the counter 134 does not fall within the predetermined range.

When the optical disk 113 is just beginning to be rotated, (i.e., before time T1 in FIG. 7), the rotational speed of the optical disk 113 is not yet normal. The frequency of the control signal thus does not fall within the predetermined frequency range. The latch signal output ends LO$_1$ and LO$_2$ of the latch circuit 136 correspond to the count "0". The count "0" is compared by the comparator 139 with the count of the ramp counter 140. When the count of the latch circuit 136 is smaller than the count of the ramp counter 140, the comparator 139 produces an output of L level. However, when the count of the latch circuit 136 is equal to or larger than that of the ramp counter 140, the comparator produces an output of H level.

Figure 7:
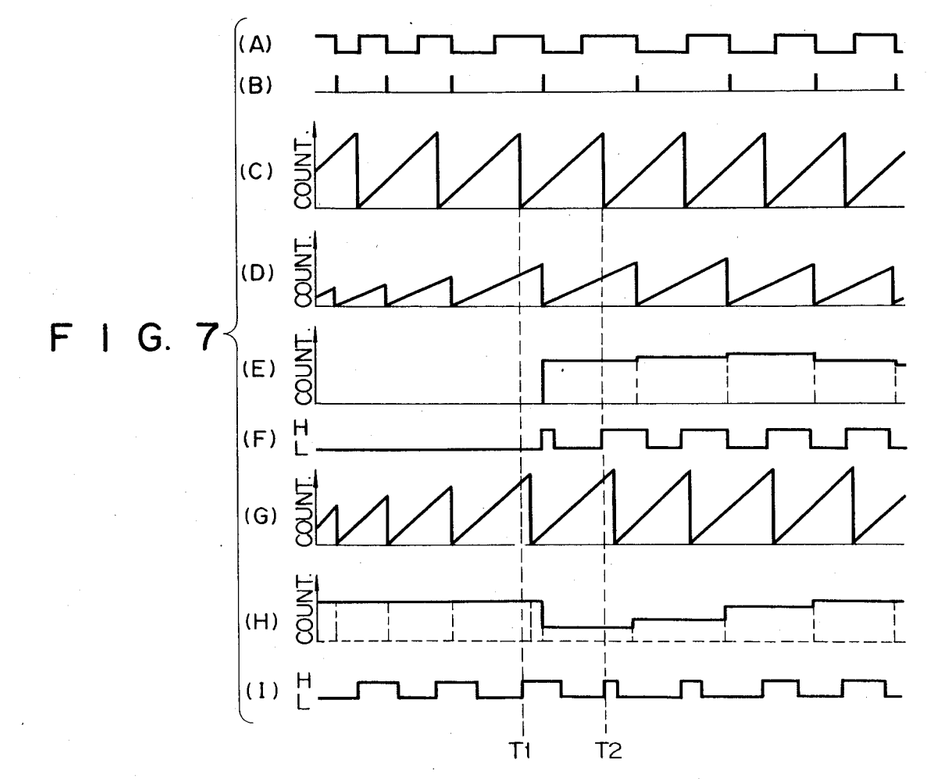

Before time T1 in FIG. 7, the output from the comparator 139 is kept at L level, as shown in FIG. 7F. In this condition, a reference voltage $V_{OF}$ (FIG. 4) which is substantially half of a voltage $V_R$ is supplied to the disk motor 111. Note that the voltage $V_R$ is obtained from the low-pass filter 142 shown in FIG. 1 and is used for automatic frequency control.

Assume that the rotational speed of the optical disk 113 is increased and that the frequency of the control signal reaches the predetermined frequency at time T1 shown in FIG. 7. The reset signal output end RO of the AFC detector 137 is set to L level. The latch circuit 136 then starts the holding operation. The count of the hold signal is compared with the count of the ramp counter 140. The comparator 139 then produces an automatic frequency control signal (an AFC signal) as shown in FIG. 7F. In particular, the count of the latch circuit 136 which corresponds to the frequency of the control signal is compared with the count signal of the ramp counter 140 which has a reference period. A signal corresponding to the difference between the count signals from the latch circuit 136 and the ramp counter 140 is produced by the comparator and is then pulse-width modulated to produce the AFC signal. The AFC signal is then supplied as an AFC voltage to the disk motor 111 through the low-pass filter 142 shown in FIG. 1.

Meanwhile, the control signal from the input end 131 is supplied to the edge detector 143 through the 1/N divider 133. The edge detector 143 detects the trailing edge of the control signal and produces a pulse as shown in FIG. 7B every time it detects the trailing edge. In practice, the control signal is obtained by the 1/N divider 133, but it is equivalent to the signal shown in FIG. 7A, so that the waveform of the control signal is illustrated by the signal shown in FIG. 3A.

When the reference clock signal from the clock input end 135 is supplied to the count signal input end CI of the counter 146 through the 1/N divider 145, the counter 146 counts the 1/N divided signals of the clock signal. Before time T1 in FIG. 7, that is, before automatic frequency control is performed, the reset signal output end RO of the AFC detector 137 is kept at H level, so that the latch signal output ends LO$_1$ and LO$_2$ of the latch circuit 36 are kept at L level, that is, correspond to the count "0". For this reason, the control circuit 151 produces a signal of H level, and the pulse from the edge detector 143 is then supplied to the reset signal input end RI through the AND gate 152. The counter 146 is reset every time it receives the pulse from the edge detector 143 at the reset signal input end RI thereof. The count signal of the counter 146 has a waveform as shown in FIG. 7G.

The count signal from the counter 146 is supplied from its count signal output end CO to the count signal input end CI of the latch circuit 144. The latch circuit 144 holds the count signal supplied to the count signal input end CI thereof every time the pulse from the edge detector 143 is supplied to the latch pulse input end LI of the latch circuit 144. However, before time T1 in FIG. 7, the output end of the control circuit 151 is kept at H level, so that the control input end C of the latch circuit 144 is kept at H level. In this condition, the count signal from the latch circuit 144 has a predetermined magnitude, as shown in FIG. 7H. This signal is then compared by the comparator 148 with the count signal from the ramp counter 140. In this case, the count of the latch circuit 144 is set to be substantially half of the maximum count of the ramp counter 140. When the count of the latch circuit 144 is smaller than that of the ramp counter 140, the comparator 148 produces a signal of L level. However, when the count of the latch circuit 144 is equal to or larger than that of the ramp counter 140, the comparator 148 produces a signal of H level.

Before time T1 in FIG. 7, the comparator 148 produces a signal which has the predetermined period, as shown in FIG. 7H. In this condition, a reference voltage $V_{op}$ corresponding to substantially half (50% duty) of an APC voltage $V_p$ obtained through the low-pass filter 150 shown in FIG. 1 is supplied to the disk motor 111.

At time T1 in FIG. 7, the reset signal output end RO of the AFC detector 137 becomes L level. The reset signal input end RO of the counter 146 does not receive the signal from the edge detector 143 any longer. Therefore, as shown in FIG. 7G, the counter 146 counts the signals supplied to its counter signal input end CI to a predetermined value, independently of the control signal, and is automatically reset. The counter 146 repeats the above counting operation. Meanwhile, the control input end C of the latch circuit 144 is kept at L level, and the latch circuit 144 performs the holding operation. As shown in FIG. 7H, the latch circuit 144 holds the output from the counter 146 every time it receives a pulse from the edge detector 143. The count of the latch circuit 144 is compared by the comparator 148 with the count of the ramp counter 140. As shown in FIG. 7I, the comparator 148 produces the APC signal at time T2 in FIG. 7. More particularly, the value obtained by holding, together with the period of the control signal, the output from the counter 146 which performs repeat counting at a predetermined period is compared with the count signal from the ramp counter 140 which has a reference period (phase). The comparator 148 produces a pulse-width modulated signal as the APC signal corresponding to a phase of the control signal which is deviated from that of the reference signal. The APC signal is supplied as an APC voltage $V_p$ to the disk motor 111 through the low-pass filter 150.

Figure 8:
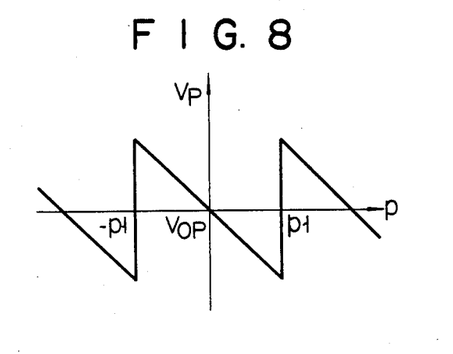
FIG. 8 is a timing chart of a motor control signal for controlling the motor control circuit shown in FIG. 6.

FIG. 8 shows the relationship between the phase (P) deviation of the control signal and the APC voltage $V_p$. Automatic phase control can be performed when the deviation in phase of the control signal falls within a range $+P1$ to $-P1$. Automatic phase control can be performed once the frequency f of the control signal is controlled to fall within a frequency range f1 to f2, as shown in FIG. 4.

The AFC voltage signal is superposed on the APC voltage signal, and the composite signal is then applied across the disk motor 111 so as to drive the optical disk 113 at a constant linear velocity.

In the control circuit which has the above arrangement, before automatic phase control is performed, that is, before time T2 in FIG. 7, the APC signal is a signal which has substantially half (50% duty) of the controllable range. Even if the APC signal is pulse-width modulated to perform actual phase control at time T2, a voltage applied across the disk motor 111 is changed with respect to the voltage $V_{op}$ in FIG. 8. Therefore, the rotational speed of the disk motor 111 may not be greatly changed, thus properly performing the motor control operation.

Furthermore, before automatic phase control is performed, the counter 146 produces an output so as to match the period (phase) of the control signal. When automatic phase control is then started, the disk motor 111 is controlled such that the phase of the count signal from the counter 146 coincides with that of the control signal. In this manner, the count signal from the counter 146 and the control signal are substantially in phase, and the idle time for phase control can be shortened. Automatic phase control is then smoothly started, thus properly controlling rotation of the motor.

The control circuit 151 will now be described in detail. The latch signal output end $LO_2$ of the latch circuit 136 is connected to the input ends of detectors 153 and 154, respectively. The detector 153 produces a signal of H level when the frequency (corresponding to the frequency of the control signal) of the count signal from the latch signal output end $LO_2$ of the latch circuit 136 is deviated from the reference frequency by more than 10%. However, when the above deviation falls within a range of 10%, the detector 153 produces a signal of L level. Similarly, the detector 154 produces a signal of H level when the frequency of the count signal from the latch signal output end $LO_2$ of the latch circuit 136 is deviated from the reference frequency within a range of 5%. When this deviation is more than 5%, the detector 154 produces a signal of L level. The set signal output end SO of the AFC detector 137 is kept at H level when the frequency of the control signal is deviated from the normal frequency by more than 10% (e.g., 20%). When this deviation falls within a range of, e.g., 20%, the set signal output end SO of the AFC detector 137 becomes L level. The AFC detector 137 detects when the frequency of the control signal has reached a predetermined frequency. The detected frequency is further detected in detail by the detectors 153 and 154.

The output ends of the detectors 153 and 154 are connected to a set input end S and a reset input end R of an R-S flip-flop (to be referred to as an S-RFF hereinafter) 155, respectively. An output end Q of the S-RFF 155 is connected to the control input end C of the latch circuit 144 and to the one input end of the AND gate 152.

The mode of operation of the circuit having the arrangement described above will be described hereinafter. When the frequency of the control signal reaches an AFC frequency (i.e., after time T1 in FIG. 7), the latch circuit 136 holds the count signal from the counter 134 every time it receives the pulse from the edge detector 132. The hold signal from the latch circuit 136 is supplied to the comparator 139 which undergoes the predetermined operation. The hold signal is also supplied to the detectors 153 and 154.

The frequency of the count signal from the latch circuit 136 is substantially the same as that of the control signal, as described above. The detectors 153 and 154 detect whether or not the frequency deviations of the control signal with respect to the reference frequency fall within the ranges of 10% and 5%, respectively.

When the frequency of the control signal is deviated by more than 10%, the detector 153 produces a signal of H level, and the S-RFF 155 is set. The output end Q of the S-RFF 155 goes to H level, and the control input end C of the latch 144 then goes to H level. Therefore, the output from the latch circuit 144 has a level which is substantially half of the level of the maximum output from the ramp counter 140, in the same manner as the condition prior to time T1 of FIG. 7H. The voltage of the APC signal is maintained at substantially half (50% duty) of the APC voltage $V_p$.

Thereafter, when the frequency of the control signal moves closer to the reference frequency in accordance with automatic frequency control and has a frequency deviation within a range of 5%, the detector 154 becomes H level. The S-RFF 155 is then reset and its output end Q becomes L level. The control input end C of the latch circuit 144 then becomes L level. As a result, the count signal from the counter 146 is held by the latch circuit 144 every time the pulse from the edge detector 143 is supplied to the latch circuit 144, as described above. Thus, automatic phase control is performed.

Assume that the frequency deviation of the control signal is more than 5% when automatic phase control is performed after automatic frequency control. The output from the detector 154 becomes H level, but the output from the output end Q of the S-RFF 155 may not be inverted and is kept at L level. As a result, automatic phase control continues.

Now assume that the frequency deviation of the control signal is more than 10%. The output from the detector 153 becomes H level, and the output end Q of the S-RFF 155 becomes L level. The output from the latch 144 is limited to the predetermined level shown as the condition prior to time T1 of FIG. 7H. As a result, automatic phase control is interrupted.

Figure 9:
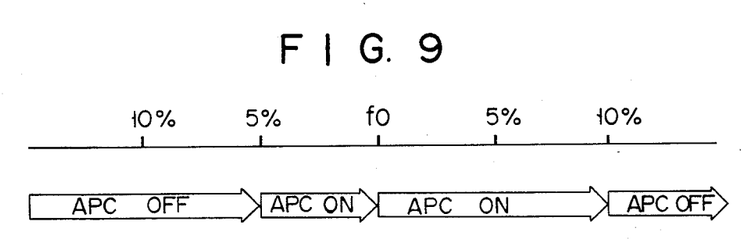
FIG. 9 is a schematic view for explaining the overall operation of the motor control circuit shown in FIG. 6.

The series of operations described above is summarized in FIG. 9. Referring to FIG. 9, APC ON indicates a condition where automatic phase control is performed, and APC OFF indicates a condition where automatic phase control is not performed. When the frequency of the control signal moves closer to the reference frequency f0 and has a deviation within the range of 5% with respect to the frequency f0, the APC ON state is obtained. On the other hand, when the frequency of the control signal moves further away from the frequency f0 and has a deviation of more than 10%, the APC OFF is obtained. In other words, when the frequency deviation of the control signal moves within the range of 5%, the APC OFF state is changed to the APC ON state. When the frequency deviation of the control signal becomes greater than 10%, the APC ON state is changed to the APC OFF state.

As may be apparent from the above description, the deviation range of the frequency of the control signal with respect to the frequency f0 is as narrow as 5% for the purpose of changing the mode from APC OFF to APC ON, and the deviation range of the frequency of the control signal with respect to the frequency f0 is as great as 10% for the purpose of changing the mode from APC ON to APC OFF. Unstable operation occurring in the conventional control circuit is therefore eliminated, thus properly controlling smooth motor rotation. Note that the detector 153 comprises a simple gate circuit and an S-RFF 155, so that the control circuit of the present invention can be arranged simply.

The MSB data signal of the ramp counter 140 is directly produced therefrom so as to achieve the 50% duty of the APC signal when automatic phase control is not performed. Alternatively, the count of the counter 146 may be preset to be the central value of the count of the ramp counter 140. In this case, when automatic phase control is initiated, the counter 146 must be reset by the pulse from the edge detector 143 so as to achieve phase control, and the counter 146 then performs repeat counting.

Figure 10:
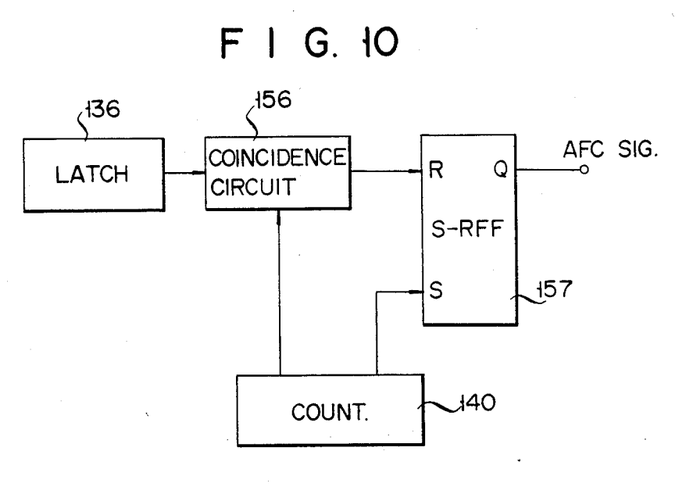
FIG. 10 is a block diagram showing a modification of a first motor control signal generating means of the motor control circuit shown in FIG. 6.
Figure 11:
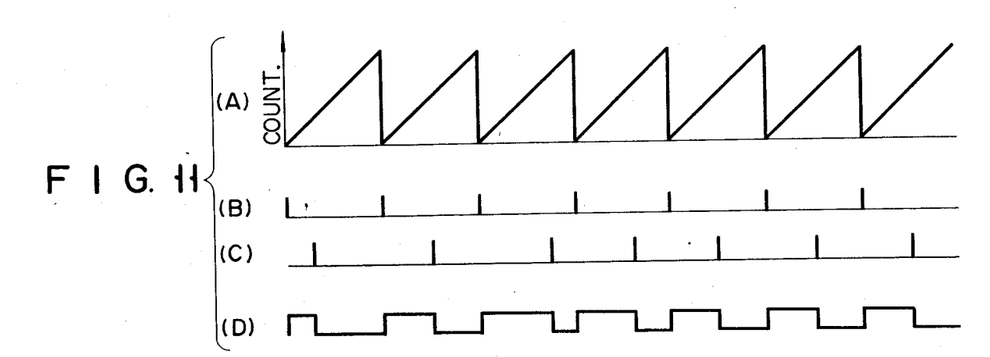

The PWM means of the first and second motor control signal generating means $122m_1$ and $122m_2$ which respectively produce the AFC and APC signals need not be limited to the arrangement shown in FIG. 6. For example, the PWM means of the first motor control signal generating means $122m_1$ which produces the AFC signal may be arranged in a manner as shown in FIG. 10. Referring to FIG. 10, a ramp counter 140 performs repeat counting with a predetermined period as indicated in FIG. 11A. The ramp counter 140 produces a count signal to a coincidence circuit 156 and produces a pulse shown in FIG. 11B every time the ramp counter 140 is reset. The pulse from the ramp counter 140 is then supplied to a set input end S of an S-RFF 157.

The hold signal from a latch 136 is also supplied to the coincidence circuit 156. The coincidence circuit 156 then produces a coincidence signal as shown in FIG. 11C. The coincidence signal is then supplied to a reset input end R of the S-RFF 157. The S-RFF 157 is thus set at H level when the pulse shown in FIG. 11B is supplied to its set input end S. The S-RFF 157 is reset when the pulse of L level shown in FIG. 11C is supplied to its reset input end R. In these cases, the S-RFF 157 produces pulses shown in FIG. 11D from its output end Q. As a result, the pulse-width modulated AFC and APC signals are obtained.

In the circuit arrangement described above, pulse width modulation can be performed without using the comparators 139 and 148 shown in FIG. 6.

Figure 12:
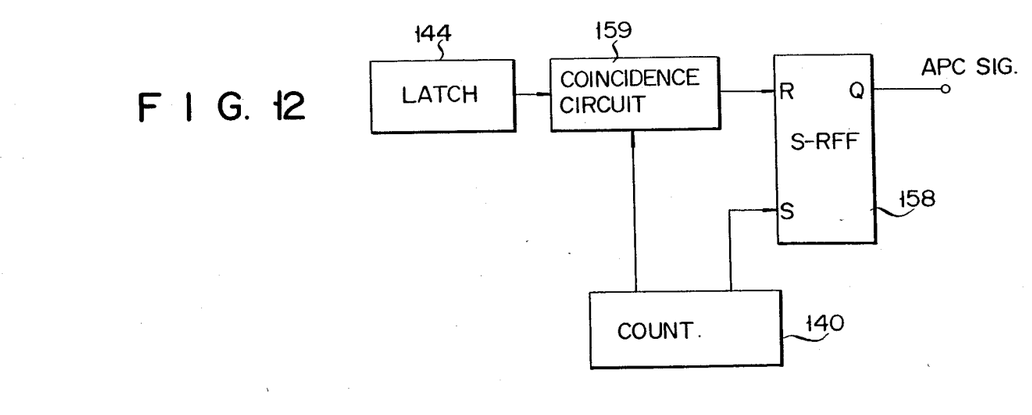
FIG. 12 is a block diagram showing a modification of a second motor control signal generating means of the motor control circuit shown in FIG. 6.

The PWM means of the second motor control signal generating means $122m_2$ can be arranged as shown in FIG. 12. An S-RFF 158 is set when a ramp counter 140 is reset. A count signal from the latch circuit 144 is compared by a coincidence circuit 159 with that from the ramp counter 140. When these signals coincide, the coincidence circuit 150 supplies a coincidence signal to reset the S-RFF 158.

What we claim is:

1. A motor control circuit for controlling a disk motor of a data reproduction apparatus responsive to a sync signal reproduced from a recording medium, comprising:
   frequency detecting means for detecting a frequency component of said reproduced sync signal and outputting a signal indicative thereof;
   phase detecting means for detecting a phase component of said reproduced sync signal and outputting a signal indicative thereof;
   first motor control signal generating means for generating a first motor control signal to control said disk motor in accordance with said output signal from said frequency detecting means;
   second motor control signal generating means for generating a second motor control signal to control said disk motor in accordance with said output signal from said phase detecting means;
   AFC detector means, responsive to said frequency detecting means, for detecting whether said frequency component of said reproduced sync signals falls within a first predetermined range, and for holding said first motor control signal at a predetermined low level when said detection is negative; and
   controlling means, responsive to said frequency detecting means, for holding said second motor control signal at a predetermined value until said output signal from said frequency detecting means falls within a second predetermined range different from said first predetermined range, and for holding said second motor control signal at said predetermined value whenever said output signal from said frequency detecting means falls out of said first predetermined range after being within said second predetermined range.

2. A circuit according to claim 1, wherein said controlling means comprises:
   a first detector which determines whether the frequency of said sync signal detected by said frequency detecting means is within said first predetermined range; and
   a second detector which determines whether the frequency of said sync signal detected by said frequency detecting means is within said second predetermined range; wherein
   said second predetermined range is smaller than said first predetermined range to thereby define a hysteresis effect with which said controlling means selectively holds said second motor control signal at said predetermined value.

3. A circuit according to claim 2, wherein:
   said frequency detecting means comprises
      a first counter for counting a reference clock signal, which has a predetermined frequency higher than said frequency of said sync signal, independent of said sync signal, every time a unit period of said sync signal elapses, and
      a first latch circuit for holding a count signal from said first counter every time one of said unit periods of said sync signal elapses; and
   said phase detecting means comprises
      a second counter, responsive to said first detector, to repeatedly count said reference clock signal and reset every time said unit period of said sync signal elapses, and, responsive to said second detector, to repeatedly count said reference clock signal to a predetermined count and reset, and a second latch circuit for holding a count signal from said second counter every time said unit period of said sync signal elapses.

4. A circuit according to claim 3, wherein:

said first motor control signal generating means comprises a ramp counter for repeating a counting operation such that said ramp counter counts said reference clock signal to a predetermined value and is then reset at a predetermined period, and a first comparator for comparing an output from said ramp counter and said held signal from said first latch circuit, and for producing a first pulse-width modulated signal for use in automatic frequency control of said disk motor; and said second motor control signal generating means comprises a second comparator for comparing said output from said ramp counter and said held signal from said second latch circuit, and for producing a second pulse-width modulated signal for use in automatic phase control of said disk motor.

5. A circuit according to claim 3, wherein said first motor control signal generating means comprises a ramp counter which repeats a counting operation such that said ramp counter counts said reference clock signal to a predetermined value and is then reset at a predetermined period, a first coincidence circuit for detecting a coincidence between an output from said ramp counter and said held signal from said first latch circuit, and a first bistable circuit which is reset by an output from said first coincidence circuit and which produces a first pulse-width modulated signal for automatic frequency control which corresponds to a frequency deviation in the frequency of said reproduced sync signal when the disk motor is driven in a normal condition; and said second motor control signal generating means comprises a second coincidence circuit for detecting a coincidence between the output from said ramp counter and said held signal from said second latch circuit, and a second bistable circuit which is reset by an output from said second coincidence circuit and which produces a second pulse-width modulated signal for automatic phase control which corresponds to a phase deviation in the phase of said reproduced sync signal when the disk motor is driven in said normal condition.

6. A circuit according to claim 1, wherein said predetermined value at which said output from said second motor control signal generating means is held corresponds to a substantially central value within an operative controllable range of said second motor control signal generated by said second motor control signal generating means.

* * * * *